Patented Apr. 2, 1935

1,996,090

UNITED STATES PATENT OFFICE 1,996,090

COAGULANT COMPOSITION

Edward A. Willson, Akron, Ohio, assignor to American Anode Inc., Akron, Ohio, a corporation of Delaware No Drawing. Application December 21, 1932, Serial No. 648,233

20 Claims. (Cl. 18—50)

This invention relates to the art of rubber manufacture, and particularly to improved coagulant compositions for use in the manufacture of shaped rubber articles directly from latex or analogous aqueous dispersions of rubber or rubber-like substances by an improved and simplified method described in my co-pending application, Serial No. 415,362, filed December 19, 1929, of which this application is a continuation in part.

Before the invention of the above-identified application, the rubber contained in aqueous dispersions such as latex had been deposited on forms by alternate dipping and drying, or by electrophoresis, or by impregnating porous forms with a coagulant and immersing them in the dispersions, or by applying suction to the interior of porous forms to remove the serum from the dispersions and leave the rubber in a uniform layer on the surface of the form. All these prior methods require a careful adjustment of properties of the latex, or require complicated and expensive apparatus, or require that the forms be very carefully prepared and even more carefully cleaned after each manufacturing cycle, all of which greatly increases the cost of the finished articles made by such processes.

By the method employing the improved coagulant compositions of the present invention rubber articles may be manufactured or objects may be rubber-coated in a very short time with the minimum of apparatus and of handling, even when the form or object is of a complicated shape. The form upon which the rubber is deposited may be of any substantially impermeable substance such as glass, glazed porcelain, metal, wood, bakelite, ebonite, or even rubber, but it is preferably made of a material which is substantially unaffected by the coagulant which is employed. Glass, porcelain, stainless steel and aluminum are particularly suitable.

According to the method of the co-pending application referred to above, the form is coated with a solution of a coagulant in a volatile solvent by any suitable method such as by dipping or spraying, and the excess solvent is eliminated, preferably by evaporation. The form thus coated with a film of coagulant is immersed in a coagulable aqueous dispersion of rubber or like substance. The coagulant diffuses into the dispersion and coagulates a continuously increasing layer of rubber thereon. When the layer of coagulated rubber has attained the desired thickness, the form together with its rubber coating is removed from the dispersion.

The coagulant composition employed in the above method may consist of a liquid or a solid acid, either organic or inorganic, or of a salt of such an acid or even of an organic liquid capable of coagulating aqueous dispersions, dissolved in a volatile solvent. Preferably the coagulant should be completely soluble in water, in order that it may diffuse rapidly and readily into the surrounding aqueous dispersion. The film remaining on the deposition form after the evaporation of the volatile solvent should preferably contain a high concentration of an active coagulant which is capable of coagulating aqueous dispersions to a firm gel; it should wet the base uniformly so that a continuous film and not a mere series of isolated droplets is formed thereon; it should itself be uniformly wet by the aqueous rubber dispersion; and should not be completely precipitated or otherwise rendered inoperative upon coming in contact with the aqueous dispersion, which is normally a more or less strongly alkaline liquid.

The coagulating substance itself is preferably a simple acid or a salt of a polyvalent metal. Such acids as formic, acetic, oxalic, hydrochloric and sulphuric, and the salts of the bivalent metals such as magnesium, the alkaline earths, zinc, copper, cobalt, cadmium, ferrous iron, lead, nickel, and manganese are preferred, but the salts of tri- and tetravalent metals such as aluminum, ferric iron, antimony, chromium, molybdenum, tin, thiorium, and zorconium may also be used. In general, the chlorides and nitrates of these metals are the most useful because of their availability and their great solubility in water and organic solvents, but the bromides, iodides, fluorides, chlorates, bromates, perchlorates, sulphates, persulphates, thiosulphates, permanganates, chromates, hypophosphites, thiocyanates, nitrites, acetates, formates, oxalates, etc. of some of the metals are sufficiently soluble in water and other solvents to merit consideration.

The particular coagulant chosen is preferably dissolved in a volatile organic solvent such as methyl, ethyl, or propyl alcohol; acetone; ether; benzol; ethyl acetate or other esters; carbon disulphide; chloroform, etc., or in some cases, water, or a mixture of such solvents. If a crystalline salt is selected as the coagulant, it may contain water of crystallization, so that the coagulant composition as applied to the form frequently contains several substances, all of which may not be mutually soluble.

In many cases upon evaporation of the volatile solvent from such a composition, a separation of phases occurs, or the coagulant film may even break and coalesce into droplets so that the desired smooth unbroken surface film is not obtained. As a consequence thereof, an irregular, uneven deposit of rubber results when the aqueous dispersion is subsequently applied to the form.

Again, a coagulant film which is smoothly and uniformly wet by the subsequently applied aqueous rubber dispersion is most desirable and frequently difficult of attainment. If the aqueous dispersion of rubber does not wet the underlying coagulant film uniformly as the coated form is lowered into the dispersion, the liquid surface of the dispersion may be drawn downward around the form to produce a depressed meniscus which subsequently breaks and allows the liquid surface to jump up to or above its normal position, only to be drawn downward again. This frequently observed jumping meniscus produces an uneven ripply deposit of rubber which gives rise to imperfect and defective articles.

A somewhat similar effect is sometimes produced in a different manner. It has often been noticed upon slowly lowering a coagulant coated form into a liquid dispersion, that a thin film of rubber is coagulated upon the surface of the dispersion surrounding the form. Such a film for a short time adheres to and is drawn downward by the descending form and then slips up the form, thereafter to be drawn downward again. These phenomena prevent uniform interfacial contact between the dispersion and the form and produce a ripply rubber deposit similar to that described above in connection with the jumping liquid meniscus. The formation of such surface films apparently is caused by rapid diffusion of coagulant along the liquid surface which of course is the first portion of the dispersion to contact with the coagulant coated form.

The present invention accordingly consists in so altering or controlling the surface tension, wetting, coagulating, or other properties of the coagulant composition as to insure the production of a uniform, smooth, unbroken coagulant film upon the form and the attainment of uniform interfacial contact between the film and the aqueous rubber dispersion.

These desired conditions are attained by adding to the coagulant composition, which usually contains a latex coagulant dissolved in a volatile solvent, a quantity of an organic material less volatile than the solvent and capable of altering the surface tension, wetting, and/or other properties of the composition in such manner as to secure the uniform wetting conditions essential to the production of perfect rubber deposits.

The less-volatile material which is added to the coagulant composition is preferably an organic substance fairly readily and substantially completely soluble in common organic solvents used in the process, and which contains a sufficient number of oxygen-containing groups to render it at least slightly water soluble. Likewise, the preferred substances are generally somewhat viscous or syrupy liquids as compared to water or organic solvents such as acetone or methanol, but this characteristic does not appear to be absolutely essential since the addition to the coagulant composition of certain soluble crystalline materials has been found to give good results. Such crystalline materials, however, appear to be those of a class whose concentrated solutions are more or less syrupy.

The manner in which the less-volatile substances in the coagulant composition function to produce the observed advantageous results is not well understood at the present time, and it is entirely possible that their function differs somewhat as the constituents of the coagulant composition are varied. In some cases, the less-volatile constituent may act as a mutual solvent for other mutually insoluble constituents and thereby furnish a common vehicle for all the constituents of the composition and so prevent any separation of phases upon evaporation of a portion of the more volatile constituent of the composition. In other cases the added material may act in a simple physical capacity and by its mere presence in the composition increase the viscosity of the coagulant film. Again it possibly serves to retard momentarily coagulation of the aqueous dispersion and so allow the dispersion to wet uniformly the coagulant film. Or, its function at times may be that of a so-called wetting agent tending through surface tension effects to improve wetting of the form by the coagulant and of the coagulant by the aqueous dispersion. Obviously, it is also possible, and in fact probable, that the function of the added material is frequently a combination of any or all of the above mentioned possibilities. However, since applicant does not at this time fully understand the exact function of the materials he uses, he does not wish or intend to limit his invention in any manner by any theory which may be advanced herein by way of explanation.

When the coagulant is dissolved in a mixture of two solvents of different volatility, the more volatile solvent is conveniently one of the volatile organic solvents, preferably one in which rubber does not swell appreciably, such as methyl alcohol, acetone, or even ethyl formate or acetate, although water may also be employed as the volatile medium. The less volatile solvent may be one of the higher monohydric alcohols, such as normal butyl alcohol or amyl alcohol; or a polyhydric alcohol such as glycerol, ethylene glycol, or diethylene glycol, as well as esters of such alcohols, like ethylene glycol monoacetate, glyceric monoacetate (monoacetin), glyceric diacetate (diacetin), or glyceric triacetate (triacetin); ethers or polyhydric alcohols such as ethylene glycol monomethyl ether, ethylene glycol monoethyl ether, ethylene glycol monobutyl ether, etc., and similar ethers of diethylene glycol.

If the coagulant itself is liquid, or if its saturated solutions are quite fluid, it will be found advantageous to employ a viscous liquid such as triethanolamine, or glyceryl butyl phthalate, as the less-volatile portion of the composition used. Dioxan and other similar liquids which are less viscous than the immediately preceding examples are however frequently found to be quite satisfactory for use in the coagulant compositions of this invention. It may even be found advantageous to add colloids such as gum-arabic, a cellulose ester, polymerized vinyl acetate, or other substances miscible with the coagulant and the various solvents, for the purpose of increasing the viscosity of the film remaining after the evaporation of the volatile portion of the solvent.

When the coagulant employed is a metallic salt dissolved in a volatile solvent, it has been found that the addition to the coagulant composition of a quantity of a material chosen from the class comprising organic compounds containing a carbonyl group (C=O) and at least one hydroxyl group (OH) attached to a carbon atom other than that of a carbonyl group, serves particularly well to aid in producing uniform wetting of the form by the coagulant film and of the film itself by the aqueous dispersion. Such materials are also very effective when used in other types of coagulant compositions.

Examples of materials within this class are: aliphatic hydroxy-acids, such as lactic, glycollic, hydracrylic, glyceric, malic, hydroxy-butyric, gluconic, etc., and their numerous esters such as methyl lactate, ethyl lactate, butyl lactate, ethyl glycerate, ethyl glycollate, ethyl hydroxy-butyrate, di-butyl tartrate, etc.; the anhydrides of hydroxy-acids such as lactic acid anhydride; the aromatic hydroxy-acids such as salicylic, mandelic, gallic, etc., and their esters like methyl salicylate; and the hydroxy-aldehydes as aldol, glyceric and salicylic aldehyde, etc.; and hydroxy-ketones or ketone-alcohols such as hydroxy acetone, or diacetone alcohol; as well as soluble carbohydrates such as sucrose, dextrose, and fructose.

These materials are preferably incorporated in the coagulant solution used in the process in quantities varying from 0.5 to 20% by weight, but greater or lesser quantities may be used without departing from the spirit and scope of the invention.

Although the materials named above have been mentioned in connection with certain types of coagulant compositions, it is not intended to imply thereby that they are useful in that particular composition alone, but on the contrary, any of the materials above named are useful in any of the several types of coagulant compositions to which it may be added, and it is not intended to limit the use of the materials to any particular type of coagulant composition.

The aqueous dispersion which is coagulated by the hereinabove described composition may be a natural latex of caoutchouc, gutta-percha, balata or similar vegetable resin, or it may be an artificial dispersion of any of the above substances or of synthetic rubber, reclaimed rubber, rubber isomers, or like substances or a mixture of any such natural or artificial dispersions. It may contain added pigments, fillers, softeners, or conditioning agents such as sulphur and accelerators, such added ingredients preferably being dispersed simultaneously with the rubber or rubber-like substance, or being intimately dispersed in water and then mixed with the main body of the dispersion. All such dispersions will hereinafter for convenience be referred to as "latex".

The base or article upon which the deposit is produced will likewise be generally termed a "form" whether the deposit is to remain thereon as a permanent coating or is to be removed therefrom after it has attained sufficient strength to hold its shape.

*Example 1.*—A vulcanizable latex composition is prepared by dispersing the desired pigments and vulcanizing agents intimately in water and mixing the dispersions with latex. For example, the quantity of concentrated latex which contains 100 parts by weight of rubber is mixed with dispersions containing 10 parts of zinc oxide, 3 parts of sulphur, 0.5 part of an organic accelerator, and 1 part of lampblack, the completed mixture containing about 50% water. Rubber derived from this composition is suitable for making soft rubber articles such as inner tubes, rubber bands, rubber gloves, bath caps, etc. If a colored rubber is desired a suitable dye is substituted for the lampblack.

If gloves are to be made, the glove forms, for example of glazed porcelain, are thoroughly cleaned and then dipped in a coagulant liquid made by dissolving 100 parts by weight of hydrated calcium nitrate $Ca(NO_3)_2.4H_2O$ in 200 parts of acetone containing 25 parts of butyl lactate. The forms are removed from the coagulant solution, and inverted to allow the film of coagulant to distribute itself uniformly over the surface of the form. After a period of from 30 seconds to 1 minute the major portion of the acetone has evaporated leaving a uniform viscous film of concentrated calcium nitrate solution containing butyl lactate on the surface of the form. The form is then dipped in the above latex composition for about 10 minutes, during which time the calcium ions diffuse slowly into the latex and coagulate a layer of vulcanizable rubber of uniform thickness on the surface of the form. The form with the adhering rubber deposit is removed from the latex and immersed for four hours in a tank of running hot water which leaches out the coagulant and other water-soluble substances including those originally contained in the latex or the other dispersions. The washed deposit, still on the form is then dried, for example in a forced circulation dryer at 150° F. and is vulcanized in open steam in the usual manner. The vulcanized glove is stripped from the form, which is immediately ready to be employed again. The thickness of the rubber in the gloves produced by the above process is about 0.05 in. but the thickness is readily varied by changing the time of immersion of the coagulant-coated form in the latex.

*Example 2.*—A metal impeller for a blower which is to be used for handling corrosive gases is carefully cleaned, preferably by sand-blasting, and is coated with an adhesive, for example by dipping in a benzol solution of a rubber isomer formed by the reaction of sulphonic acids and rubber such as those described by Fisher in United States Patent No. 1,605,180. The solvent is allowed to evaporate and the impeller is dipped in a solution of 100 parts of commercial anhydrous calcium nitrate in 200 parts of acetone containing 30 parts of glycerol. Adhering drops are removed by shaking or whirling the impeller, which is then rotated slowly while the major part of the acetone is permitted to evaporate. It is next plunged beneath the surface of a latex mixture, for example the composition described in Example 1 above, being held at such an angle, and if necessary being so rotated that air bubbles cannot be entrapped in or on the impeller. After the desired thickness of rubber is coagulated on the surface, 5 or 10 minutes usually being sufficient, the impeller is removed, washed in running water, dried, and vulcanized. The rubber covers the entire surface with a smooth flawless, uniform and perfectly adherent coating which effectively protects the underlying metal from corrosion as well as from the abrasive action of suspended solid particles.

*Example 3.*—A hard rubber composition is prepared by mixing the following ingredients in the form of concentrated aqueous dispersions: Rubber (contained in latex) 100 parts by weight, zinc oxide 2 parts, sulphur 45 parts, organic accelerator 4 parts, inert pigment 10 parts, and lampblack 2 parts.

A pressed metal steering wheel spider is freed from grease and scale and is dipped in a solution of 40 parts by weight of calcium chloride and 10 parts of lactic acid in 80 parts of methyl alcohol. The major portion of the alcohol is allowed to evaporate and the spider is immersed in the hard rubber composition for 15 minutes. After drying and vulcanizing in heated air the steering wheel is ready for use, no buffing or polishing being required.

In each of the above examples a specific coagulant solution has been specified by way of example, but it will be understood that their use is not limited thereby, but that each coagulant solution may be employed generally in accordance with the general directions hereinabove set forth.

While I have herein disclosed with considerable particularity certain preferred manners of performing my invention, I do not thereby desire or intend to limit myself solely thereto, for, as hitherto stated, the procedure may be modified, the precise proportions of the materials utilized may be varied and other materials having equivalent chemical properties may be employed if desired without departing from the spirit and scope of the invention as defined in the appended claims.

I claim:

1. A coagulant composition comprising a latex coagulant, a volatile organic solvent and a less-volatile substance having the properties of improving wetting of a form by the said composition and of improving wetting of the residue by an aqueous dispersion of rubber after evaporation of the volatile solvent.

2. A coagulant composition comprising a latex coagulant, a volatile organic solvent, and a less-volatile organic substance having the property of increasing the viscosity of the residue after evaporation of the volatile solvent.

3. A coagulant composition comprising a crystallizable latex coagulant, a volatile organic solvent, and a less volatile substance having the property of retarding crystallization of the coagulant after evaporation of the volatile solvent.

4. A coagulant composition comprising a latex coagulant, a volatile organic solvent, and an at least slightly water-soluble organic substance having the property of increasing the viscosity of the residue after evaporation of the volatile solvent.

5. A coagulant composition comprising a latex coagulant, a volatile organic solvent, and a less-volatile mutual solvent for the coagulant, the solvent, and water.

6. A coagulant composition comprising a salt of a polyvalent metal dissolved in a volatile organic solvent containing a less-volatile organic substance having the property of increasing the viscosity of the residue after evaporation of the volatile solvent.

7. A coagulant composition comprising a crystallizable salt of a polyvalent metal dissolved in a volatile organic solvent containing a less-volatile organic material having the property of retarding crystallization of the salt after evaporation of the volatile solvent.

8. A composition of matter comprising a coagulant for colloidal dispersions, a volatile organic solvent and an organic compound consisting solely of the elements carbon, hydrogen, and oxygen, and containing at least two oxygen atoms, one of which is bound on the one hand to a hydrogen atom and on the other hand to a carbon atom which is not directly bound to another oxygen atom, the other of the two oxygen atoms bound to a different carbon atom being further bound to a hydrogen atom or to the same or a different carbon atom.

9. A coagulant composition comprising a latex coagulant, a volatile solvent, and an organic compound containing a carbonyl group and at least one hydroxyl group attached to a carbon atom other than that of a carbonyl group.

10. A coagulant composition comprising a latex coagulant, a volatile solvent, and an organic ester of lactic acid.

11. A coagulant composition comprising a latex coagulant, a volatile organic solvent, and an alcohol substantially more viscous and less volatile than the volatile solvent.

12. A coagulant composition comprising a salt of a polyvalent metal dissolved in a mixture of a volatile organic solvent and an organic compound containing a carbonyl group and at least one hydroxyl group attached to a carbon atom other than that of a carbonyl group.

13. A coagulant composition comprising a salt of a polyvalent metal dissolved in a volatile organic solvent containing an organic ester of a hydroxy acid.

14. A coagulant composition comprising a salt of a polyvalent metal dissolved in a volatile organic solvent containing an organic ester of lactic acid.

15. A coagulant composition comprising a salt of a polyvalent metal dissolved in a volatile organic solvent containing an alkyl ester of lactic acid.

16. A coagulant composition comprising a latex coagulant, a volatile organic solvent and a soluble colloid having the property of increasing the viscosity of the residue after evaporation of the volatile solvent.

17. A composition of matter comprising a coagulant for colloidal dispersions dissolved in a volatile solvent containing an organic ester of a hydroxy acid.

18. A composition of matter comprising a coagulant for colloidal dispersions dissolved in a volatile solvent containing an organic ester of an aliphatic hydroxy acid.

19. A composition of matter comprising a coagulant for colloidal dispersions dissolved in a volatile solvent containing an alkyl ester of an aliphatic monohydroxy acid.

20. A composition of matter comprising a coagulant for colloidal dispersions dissolved in a mixture of a volatile organic solvent and an at least slightly water soluble polyhydroxy organic compound which is substantially more viscous and less volatile than the volatile solvent.

EDWARD A. WILLSON.